United States Patent [19]

Davis

[11] Patent Number: 4,710,293
[45] Date of Patent: Dec. 1, 1987

[54] FILTER CLOTH CAKE REMOVAL DEVICE

[75] Inventor: Steven S. Davis, Farmington, Utah

[73] Assignee: Envirotech Corporation, Menlo Park, Calif.

[21] Appl. No.: 806,656

[22] Filed: Dec. 9, 1985

[51] Int. Cl.⁴ .............................................. B01D 25/32
[52] U.S. Cl. .................................... 210/225; 210/227; 100/198
[58] Field of Search .............. 210/225, 227, 230, 228, 210/229, 231; 100/196, 198

[56] References Cited

U.S. PATENT DOCUMENTS

| | | | |
|---|---|---|---|
| 3,289,844 | 12/1966 | Emele | 210/225 |
| 3,622,005 | 11/1971 | Kurita | 210/225 |
| 3,669,273 | 6/1972 | Kurita | 210/225 |
| 4,219,425 | 8/1980 | Yoshiba | 210/225 |
| 4,397,744 | 8/1983 | Haruo | 210/225 |

FOREIGN PATENT DOCUMENTS

0018243 4/1981 Japan .................................. 210/225

Primary Examiner—Richard V. Fisher
Assistant Examiner—W. Gary Jones
Attorney, Agent, or Firm—Trask, Britt & Rossa

[57] ABSTRACT

An apparatus for automatically removing cake deposits from the surface of filter cloths within a filter press is disclosed. The apparatus includes a rod for suspending the cloth in a substantially inverted "V"-shaped configuration. The cloth is then slackened by lowering a rod over which the cloth is folded. The rod is then suddenly forced upwardly under the driving force of a loading means. The rod draws the cloth to a taut, tensioned condition, imparting a whip-like motion to the fabric of the filter cloth. This imparted motion serves to disengage the cake from the filter cloth.

8 Claims, 7 Drawing Figures

FILTER CLOTH CAKE REMOVAL DEVICE

BACKGROUND OF THE INVENTION

1. Field

This invention relates to filter presses, specifically those designed to separate solids from liquids. More particularly, this invention is directed to presses which utilize a fabric filter cloth as a means of removing solids from liquid systems.

2. Statement of the Art

Technical attention has long been devoted to the processing of solids-bearing liquids, such as slurries and other suspended solids systems. Of prominence among the conventional means adopted to process these liquid-solid suspensions is the plate and frame filter press which typically includes a series of parallel, generally vertically oriented filter plates which are covered by a fabric filter cloth. The plates, during operation of the filter, are held in an abutting arrangement. In this arrangement, a plurality of enclosed spaces are defined between each pair of adjacently positioned plates. The liquid-solid suspension to be filtered is injected under pressure into the enclosed spaces. The suspension is forcibly directed through the filter cloths whereupon the solids within the suspension are deposited on the surface of the filter cloths. Recognizably, after a period of operation, the cloths become sufficiently laden with solid deposits that further efficient operation of the press requires the plates to be separated and the solid deposits to be removed from the cloths.

In those instances wherein the solid deposits or filter cakes slightly or moderately adhere to the filter cloth, the mere opening of the abutting plates will often result in the cake falling off the filter cloths under the force of gravity. In those cases wherein the cake is in a sticky engagement with the filter cloth, other means are required to successfully separate the cake from the filter cloth.

A conventional approach to the cake having a sticky engagement with the filter cloth has been a physical removal of the cake from the cloth with a scraper. Noticeably, this approach involves a serious likelihood that the cloth may be damaged by the abrasive contact between the scraper and the cloth. Further, provision of a scraper typically requires the employment of a worker to manipulate that scraper. Various methods have also been proposed directed to automating the process of filter cake removal.

U.S. Pat. No. 3,622,005 to Kurita discloses a frame assembly adapted with means of suspending a filter cloth between each pair of the open filter plates. The cloth is suspended in a modified inverted "V"-shaped configuration. The solids are deposited on the interior surfaces of the filter cloth forming the "V"-shaped configuration, thereby initially permitting a gravitationally induced removal of the cake from the filter cloth surface. Thereafter, the disclosure suggests an oscillating or vibrational action being transferred to the cloth by means of a spring-biased actuation assembly.

U.S. Pat. No. 3,669,273 to Kurita adopts a similar vibration-based approach by providing a filter cloth suspension system which employs a cloth support which is vibrated by the motion of a spring associated with a superiorly positioned trolley which travels along a wave-like rail surface. This system utilizes a modified "V"-shaped suspension approach by adopting a non-symmetrical suspension support of the cloth in order to initiate the travel of the trolley along its rail.

In U.S. Pat. No. 4,397,744 to Haruo, a vibrational motion is transferred to each inverted "V"-shaped filter cloth by means of a support arm having a series of wave-like undulations in the surface thereof. The support arm is pivotedly mounted on its one end to a filter plate. As adjacent filter plates are opened, i.e. separated, the support arm is pulled over a support which interacts with the undulated support arm surface to effect an oscillating motion to the support arm. The support arm is linked through a spring to a rod supporting the filter cloth. As the support arm oscillates, the filter cloth is made to vibrate.

In those instances wherein the filter cake is composed of a thioxotropic material, the addition of energy to the cake by a vibrational system may operate to complexify, if not hinder, the removal of the cake from the cloth. Specifically, thioxotropic material by definition tends to "puddle," i.e. become fluid upon the placement of shear forces on the mass of the material. In subjecting the cakes to vibrational action, shear forces are generated on the cake at the interface of the cake and filter cloth, and further within the mass of the cake itself. It follows that vibration tends to transform portions of the cake into a fluid which often is more sticky in its adhesion or engagement with the filter cloth than the unvibrated cake.

In the event the vibrated cake develops fluidized pockets or strata within the cake itself, it is likely that the cake would slough off portions thereof as opposed to falling from the filter in toto. The disclosures of Kurita define mechanisms which induce a damped vibrational action within the suspended filter cloth, i.e. the vibration-inducing action of the actuating apparatus is translated to the filter cloth through means of a spring which in turn dampens the motion of that actuating apparatus. The dampening of that motion tends to encourage a series of vibrations which are of low intensity, thereby facilitating considerable energy transfer to the filter cake.

SUMMARY OF THE INVENTION

An apparatus for removing filter cake in a filter press is disclosed. An apparatus constructed in accordance with the instant invention is adapted for association with a filter press which includes a plurality of filter plates mounted in essentially parallel and upright fashion upon a frame assembly. The filter plates are mounted with means for moving the plates along the frame assembly to facilitate the opening, i.e. the separation, of each abutting pair of plates.

The filter press of the instant invention typically includes a filter cloth or medium which is positioned upon an abutting face of each filter plate, i.e. between each pair of filter plates in a conventional manner. The filter cloth is suspended from a horizontal rod typically mounted above and between each pair of plates. The filter cloth or medium is typically folded over the horizontal rod. Further, the filter cloth is conventionally secured at each of its ends to a respective lower portion of the respective abutting filter plates. This arrangement of horizontal rods, together with a filter cloth securely positioned at its end sections to abutting adjacent filter plates, results in an essentially inverted "V"-shaped cross-sectional configuration or orientation of the filter cloth upon the opening or separation of each adjacent pair of filter plates.

The instant invention is directed towards a means and method of impulse- or impact-loading the filter cloth through means of the horizontal rod support, whereby the filter cloth is suddenly drawn taut under tension from a substantially untensioned, slackened position whereby the cake or other debris which are deposited on the surface of the filter cake are forcefully ejected by the whip-like or snapping motion imparted to the fabric of the filter cloth.

An apparatus constructed according to the instant invention generally includes a filter cloth suspension means mounted above the filter press and adapted to suspend the filter cloth in a tensioned orientation, e.g. a substantially inverted "V"-shaped configuration, upon the opening of the adjacent filter plates housing the filter cloth. The suspension means may also function as a mounting platform for an impulse- or impact-loading means which is adapted to ease and substantially lessen any tension applied to the filter cloth by the horizontal rod by displacing that rod downwardly. The displacement of the rod downwardly causes the filter cloth to reach a slackened condition. Thereafter, the impact-loading means suddenly applies an impact-tensioning load to that filter cloth through a rapid displacement of the horizontal rod upwardly, thereby bringing the filter cloth to a taut condition. This sudden tensioning of the filter cloth imparts a whip-like or snapping motion to the cloth which results in the displacement of the filter cake from the surface of the filter cloth. The instant invention is not directed toward vibrating the filter cloth. Instead, the displacement of the cake from the filter cloth results from a sudden and violent snapping of the slackened filter cloth as opposed to an oscillating or vibrationally induced motion within the cloth.

In a preferred embodiment, the filter cloth suspension means includes generally a pair of suspension arms which are positioned on each of the opposed sides of each respective pair of filter plates. The suspension arms are mounted pivotedly at their proximal end to a first adjacent filter plate and at their distal end to a corresponding positioning on the opposing second adjacent filter plate.

Each suspension arm may include a pivoted juncture positioned proximate the midpoint of the suspension arm whereby the suspension arm adopts an essentially "U"-shaped or "V"-shaped configuration. The pivoted juncture permits the suspension arm to open and close as the corresponding adjacent filter plates are opened and closed. The invention is also adapted for the opening of a plurality of adjacent filter plates and their subjection to a simultaneous filter cake-removing force application.

Positioned on the suspension arms is an impulse- or impact-loading means which may be a resilient elastic member. In a preferred embodiment, this loading means may be a plurality of spring members, e.g. coil springs, which are positionable between two orientations or conditions—a first condition wherein energy, which is typically resultant from the spring being compressed under the action of a driven contact plate into a compressed orientation, is stored in the loading means (e.g. springs); and a second condition wherein the driven compressive action of the contact plate is released suddenly, permitting the spring member to return to an equilibrium position and thereby effecting a rapid, upward displacement of the horizontal rod and an accompanying whip-like or snapping motion being induced within the filter cloth.

A proximal end of each spring member is fixedly mounted to the suspension means. The distal end of each spring member is mounted in contact with a first contact plate, which plate is displaceable between the described first condition wherein the spring is compressed and a second condition wherein the plate does not effect a compressing action upon the spring and in fact may actually not be in contact with the distal end of the spring.

The first contact plate may include a first connection means which extends from the plate and further may extend through the interior of a coiled spring. The first connection means may include a horizontally positioned bar which extends essentially parallel to the horizontal rod. The horizontal bar member includes a second connection means adapted to connect with the horizontal rod. The first connection means is fitted with an abutment surface. The first abutment surface is adapted to be contacted and driven by a second contact means which itself is adapted to be moved between two distinct conditions—a first condition in which the contact plate effects a driven downward displacement of the first connection means and thereby effects a downward displacement of the horizontal rod; and a second condition wherein the second contact plate is essentially retracted suddenly from the abutment surface of the first connection means, and in effect may actually be withdrawn from contact with the abutment surface of the first connection means. This retraction permits the spring which is compressed under the first condition to expand and direct the horizontal rod suddenly upward, thereby drawing the cloth taut by a tensioning impulse- or impact-loading of the filter cloth. This sudden displacement of the cloth effects a whip-like or snapping motion within that filter cloth which discharges the cake deposits from the filter cloth.

The second contact plate is actuated by a driving actuation means. This actuation means may include pneumatic or hydraulic means adapted to effect the downward displacement or first condition of the second contact plate. A secondary spring means which may be fitted to the second contact plate is adapted to effect a sudden and rapid retraction of the second contact means from the abutment surface upon the release of the downwardly driving force on the second contact means.

BRIEF DESCRIPTION OF THE DRAWINGS

FIG. 2 includes a cut-away view;

DESCRIPTION OF THE ILLUSTRATED EMBODIMENTS

Figure 1:
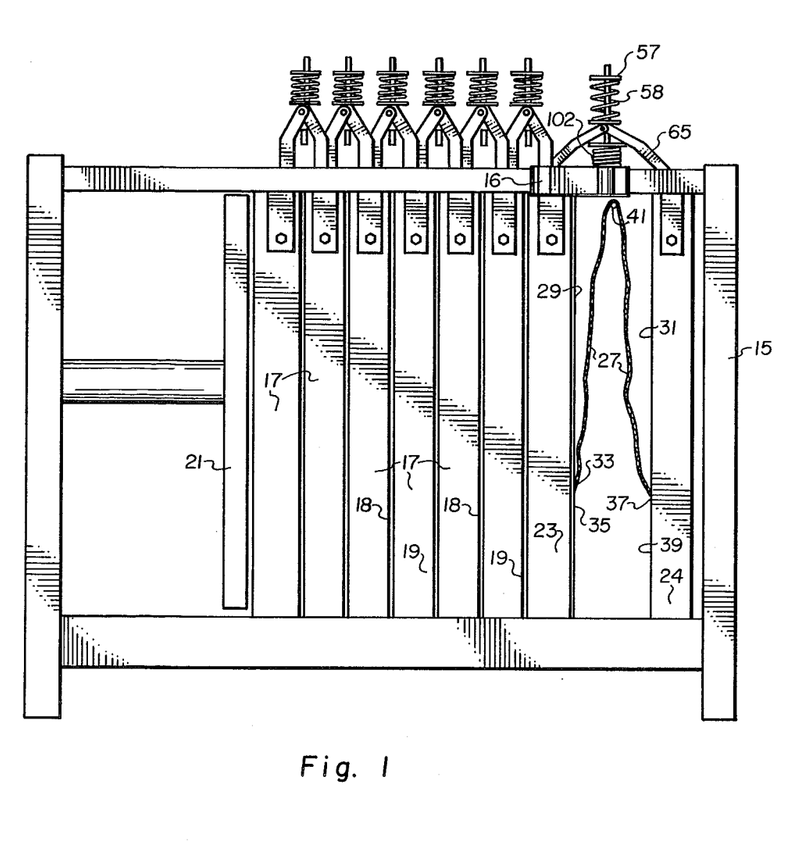
FIG. 1 is a side view of a conventional filter press fitted with the filter cake removal apparatus of the instant invention. As shown, the new apparatus is fitted on the top or upper portions of the filter press.
Figure 7:
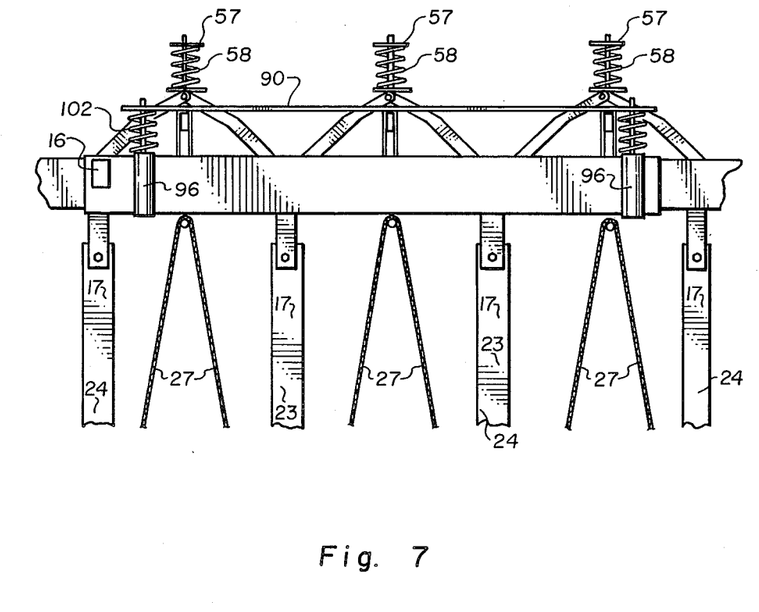
FIG. 7 is a partial side view of a filter press of the instant invention adapted for simultaneous multiple plate opening and cake removal.

As shown in FIG. 1, a conventional filter press includes generally a frame assembly 15 which provides an essentially channel-like construction for the containment of a series or plurality of filter plates 17. Filter plates 17 are generally of a rectangular, planar configuration and are oriented in a substantially upright positioning. As shown, the filter plates 17 are positioned parallel one another such that each plate, generally 10, is in an abutting relationship with an adjacent plate, generally 19. The plates 17 are driven along the channel defined by frame assembly 15 under the action of a power-driven head, generally 21. The frame assembly 15 is fitted with means shown generally as separation means 16. Separation means 16 is of a type conventionally known in the art, such as that shown in U.S. Pat. No. 4,105,560 (Fismer). Separation means 16 is adapted for separating or opening each pair of plates 17. The invention also contemplates a separation means such as shown in Fismer wherein a multiplicity of pairs of plates 17 may be simultaneously opposed as shown in FIG. 7. As shown, two plates 23, 24 are in an opened position, that is, each plate is substantially removed from an abutting relationship with one of its adjacent plates, thereby exposing a filter cloth 27 which is positioned between the abutting faces 29, 31 of the respective plates 23, 24.

Filter cloth 27 is generally rectangular in configuration and, as shown, includes a proximal end 33 which is substantially fixed, or alternately securely fastened, to the lower regions 35 of the plate 23. Similarly, the distal end 37 of the filter cloth or medium 27 is fixedly mounted to the lowermost regions 39 of plate 24.

Figure 5:
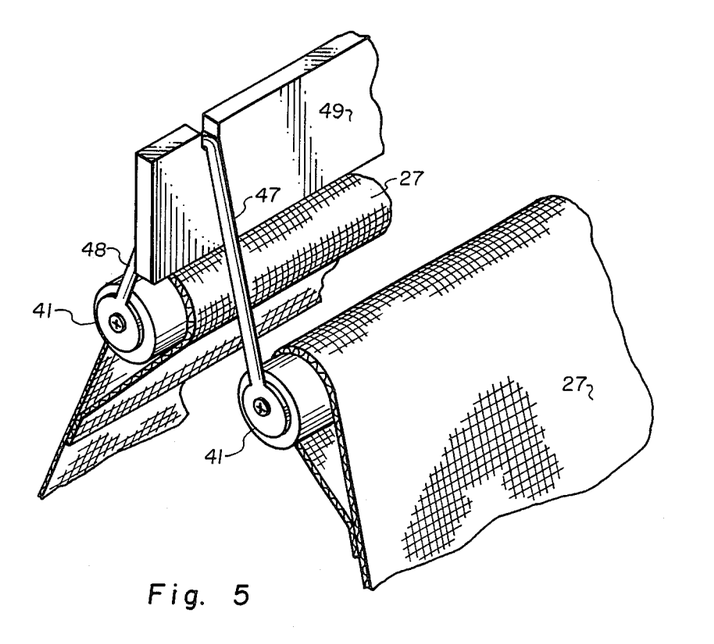
FIG. 5 is an elevational perspective view of a portion of a suspension means of the instant invention adapted for supporting the filter cloth.
Figure 6:
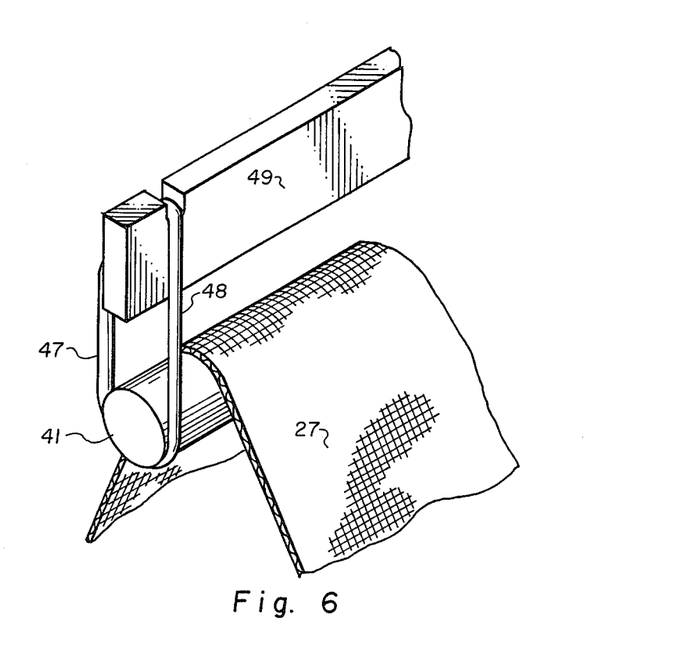
FIG. 6 is an elevational perspective view of a portion of an alternative suspension means of the instant invention adapted for supporting the filter cloth.

As shown in FIG. 6, the filter cloth 27 is folded or draped proximate its central portion over a horizontal rod 41 which extends essentially parallel to the planes of abutting faces 29, 31 of the respective plates 23, 24. Horizontal rod 41 is positioned substantially above and between the plates 23, 24. The horizontal rod 41 in suspending the filter cloth imparts a substantially inverted "V"-shaped configuration or orientation to the filter cloth 27. Alternately, as shown in FIG. 5, the filter cloth 27 may include two separate panels 28, 30 which are each draped and secured to a respective horizontal rod 41A and 41B. Horizontal rods 41A, 41B similarly function to suspend the filter cloth in an essentially inverted "V"-shaped cross-sectional configuration.

Figure 4:
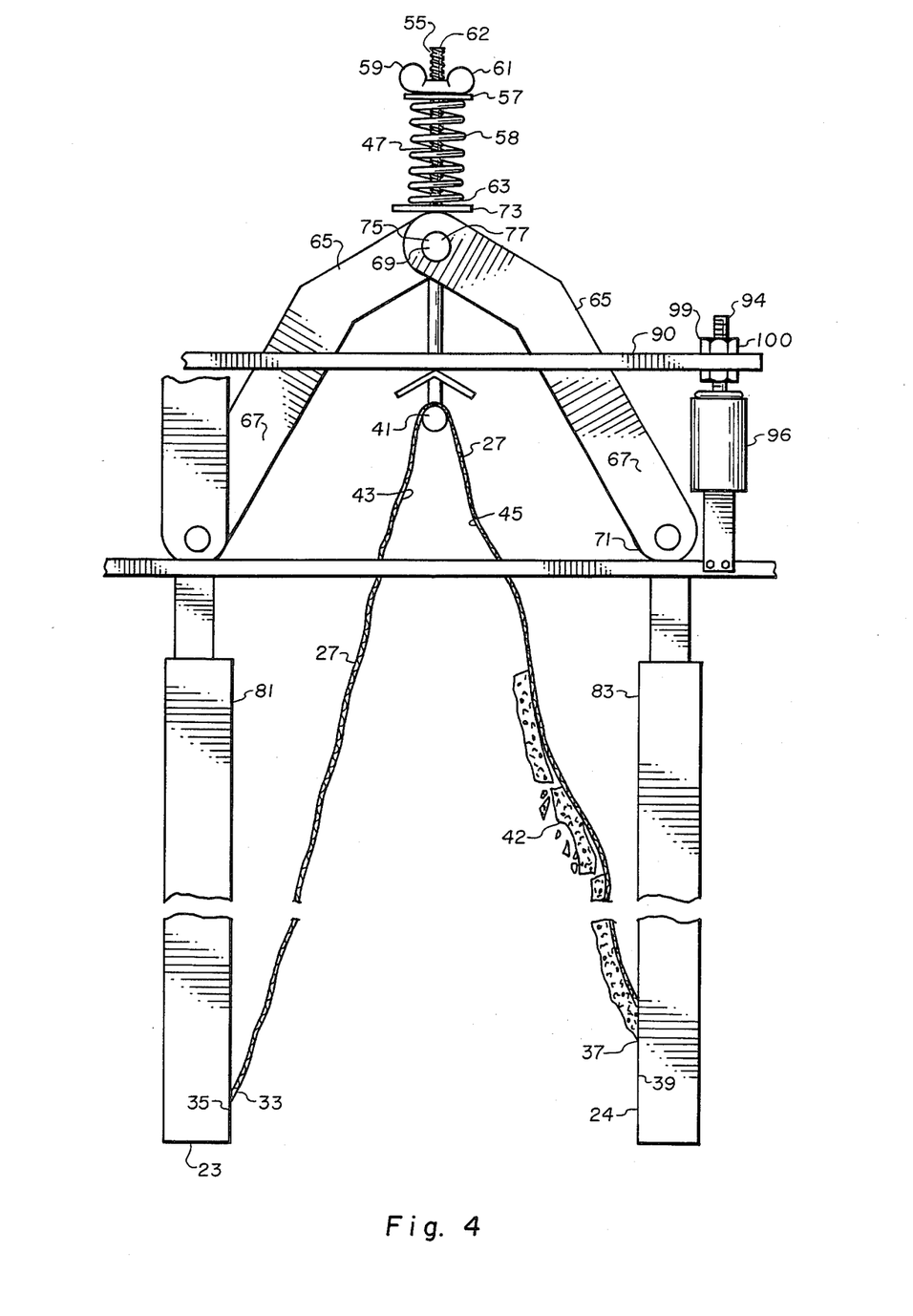
FIG. 4 is a side view of the instant invention similar to that shown in FIG. 3 wherein the filter cloth is shown in a substantially untensioned or slackened orientation.

As shown in FIGS. 1 and 4, the filter cloth 27 is positionable within a variety of configurations. These configurations result essentially from variations in the elevation or orientation of the horizontal rod 41. A displacement or positioning of the horizontal rod 41 at a lower elevation results in the filter cloth 27 being substantially slack and untensioned. As shown specifically in FIG. 1, this slackened condition generally results in the surface of filter cloth 27 adopting an irregular as opposed to a smooth linear cross-section. The irregularity is in part resultant from the deposits of solids or cake materials 42 which are positioned on the interior facing surfaces 43, 45 of the filter cloth 27. As the cloth 27 is slackened, cracks or fissures may result in the cake deposits, thereby encouraging a displacement of some of the cake from the surface of filter cloth 27.

Figure 2:
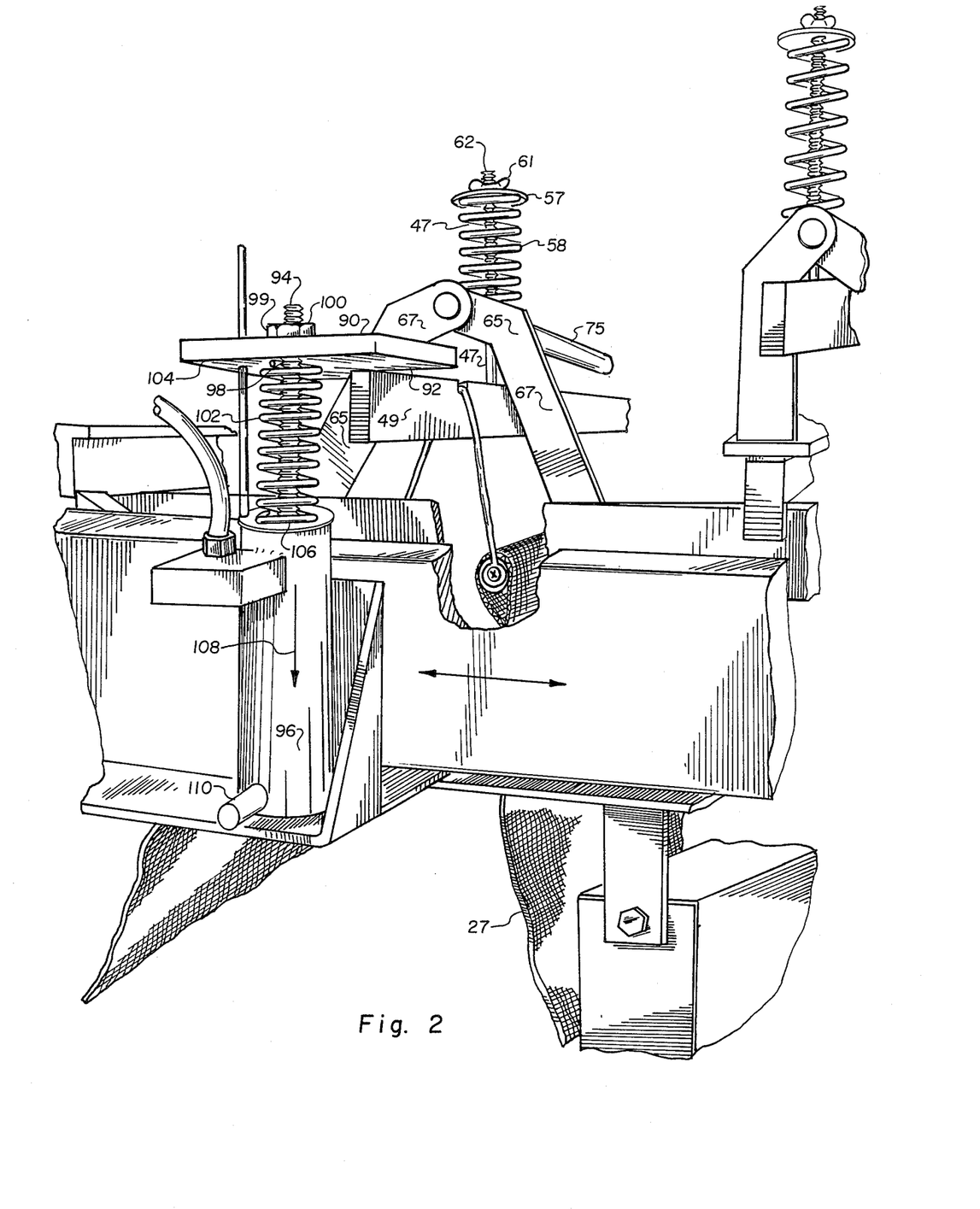
FIG. 2 is a perspective elevational view of the actuation means of the filter cake removal apparatus of the instant invention.
Figure 3:
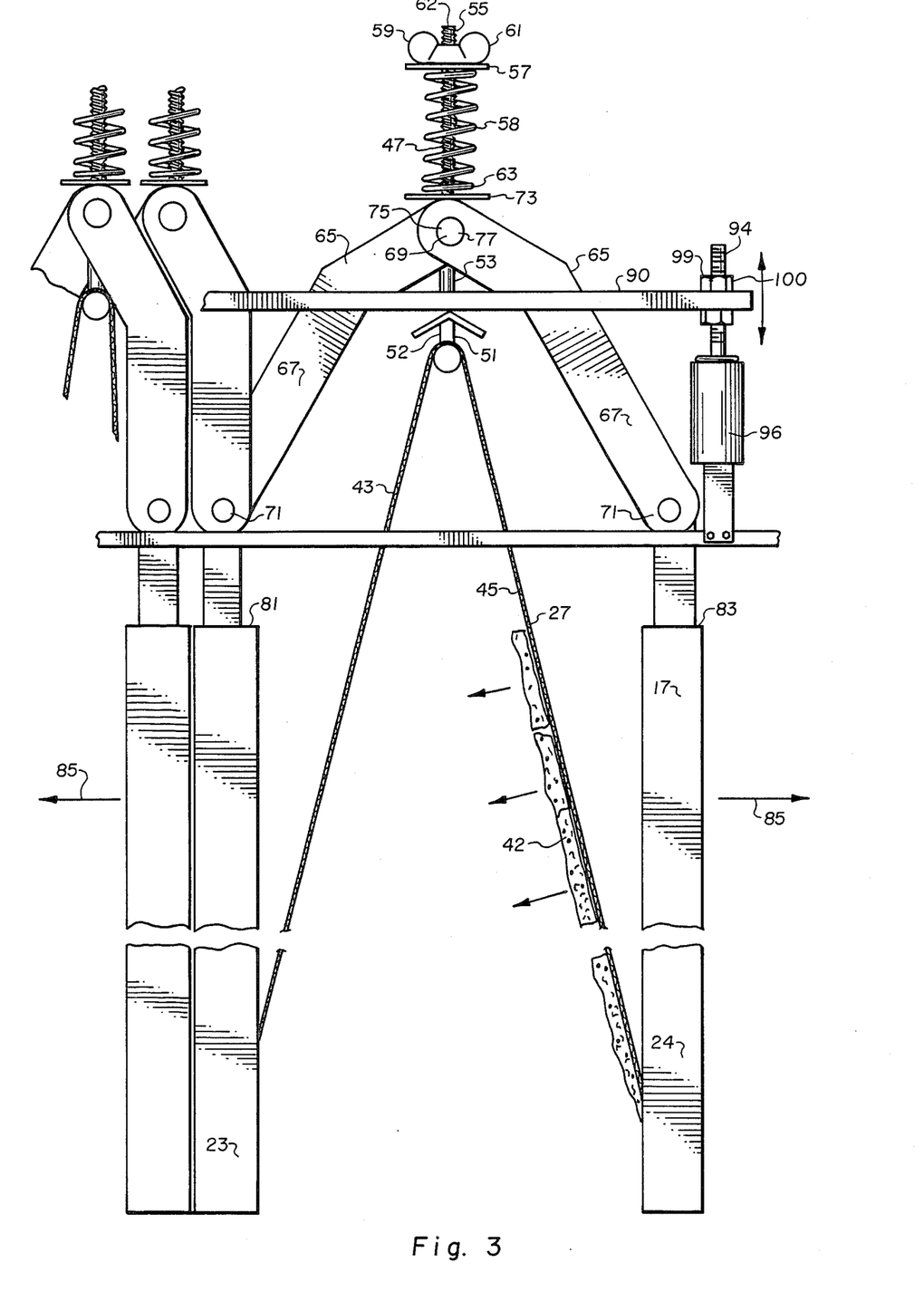
FIG. 3 is a side view of the suspension means and attendant impact-loading means of the instant invention showing the filter cloth in an essentially taut, tensioned and impact-loaded condition prior to the discharge of the cake from the filter cloth surface.

The horizontal rod 41 is held in position by the action of connection means 47. As shown in FIG. 2, connection means 47 may comprise a substantially cable-like member 48 which is positioned around the circumference of the horizontal rod member 41 and extends upwardly to be secured about a bar member 49 within a channel 50 defined within that bar member 49. Bar member 49 extends essentially parallel to horizontal rod 41 substantially along its complete length. Alternately, as shown in FIG. 4, the rod 41 may be connected to a connection means 51 which includes an essentially shaft-like member 52 which extends downwardly and is fixedly mounted on the horizontal rod 41.

In both constructions, either the horizontal bar 49 or the connection means 51 is fitted to an upwardly extending shaft 53. Shaft 53 extends upwardly and is fitted proximate its end 55 to a first contact plate 57. As shown, contact plate 57 may be an essentially planar member having a sufficient contact surface to abut against a spring-like or elastic member 58. Spring-like member 58 may be a coil spring.

Contact plate 57 is securely held from displacement toward the end 55 of shaft 53 by a restraining means 59. This restraining means 59 may be an interiorly threaded nut 61 which is fitted about a threaded portion 62 of the shaft 53. Spring 58 is fitted at its distal end 63 to a platform 73. Platform 73 is mounted on a rod 75 which forms the pivot 77 of suspension arms 65. Rod 75 extends between the pairs of suspension arms 65 which are located at opposing sides of the frame assembly 15 (not shown). As shown, suspension arms 65 may each include a pair of auxiliary arm members 67 which are pivotedly mounted at point 69 so as to be rotatable about pivot point 69. The distal end 71 of each arm 67 is pivotedly mounted on the opposing upper structural region of each pair of adjacent filter plates 23, 24, thereby defining an essentially inverted "V"-shaped configuration which is expandable about pivot point 69; i.e., upon filter plates, generally 81 and 83, being displaced in the directions indicated generally by 85, the ends 71 of auxiliary arms 67 are likewise displaced along directions 85. Upon the filter plates 23, 24 being brought into abutment, the ends 71 of arms 67 are likewise brought into close proximity.

Positioned proximate the horizontal bar 49 is a second contact plate 90. In FIG. 2, this contact plate 90 is shown as a substantially rectangular planar member. Contact plate 90 abuts against bar 49 on an abutment surface, generally 92. Contact plate 90 is mounted on a threaded shaft 94 which extends from a pneumatic or hydraulic piston, generally 96. As shown, piston 96 is mounted on a movable carriage 99 which also carries separation means 16. The threaded shaft 94 is dimensioned to be slidably received within an aperture 98 within the contact plate 90. A portion of shaft 94 extends through an aperture 98 in contact plate 90 and is fitted with a retaining means 99, e.g. a threaded bolt 100, which retains the contact plate 90 against any upward displacement.

An auxiliary spring 102 is mounted in abutment against the side 104 of plate 90 opposite the retaining means 99. The distal end 106 of spring 102 is mounted in abutment against piston 96 such that upon the driven displacement of contact plate 90 downwardly, i.e. in the direction indicated by arrow 108, the spring 102 is compressed, thereby storing energy. Upon the piston 96 removing any downwardly directed force application to the contact plate 90, e.g. in the case of a pneumatic piston by releasing air pressure through outlet 110, the spring 102 forcefully directs the contact plate 90 upwardly, thereby releasing any downwardly directed force application upon bar 49.

As shown in FIG. 7, the construction of the instant invention may facilitate a multiple filter plate processing wherein a plurality of adjacent filter plate pairs, as opposed to a single pair of such plates, are opened by the separation means 16. Thereafter, the second contact plate 90 which extends sufficiently so as to contact the abutment surface 92 of each respective pair of plates 17 is driven downwardly by the simultaneous action of two pistons 96 which are individually positioned on opposing ends of the second contact plate 90.

In operation, a filter press having a plurality of upright, abutting filter plates 23, 24 is injected with solids-bearing liquid. The liquid, in passing through filter cloths 27 arranged between each pair of abutting plates 23, 24 deposits the solids suspended therein on the filter cloths 27. Upon draining the liquid, each pair of adjoining plates 23, 24 is systematically separated, i.e. opened. Upon the opening of each pair of plates 23, 24, the respective filter cloth 27 is oriented in a substantially inverted "V"-shaped cross-sectional configuration due to the support action of horizontal rod 41 positioned above and between the adjacent plates 23, 24.

The rod 41 is then forced downwardly by the action of a driven second contact plate 90 which is driven by a pneumatic, hydraulic or other power source 96. Upon being forced downwardly, the rod 41 permits the filter cloth 27 to reach a slackened, substantially untensioned orientation. The downward displacement of rod 41 is resisted by a plurality of springs 58 which are connected to the horizontal rod 41 by a linkage assembly or first connection means. Upon the rod 41 reaching a predetermined elevation or position, the driving force on the second contact plate 90 is suddenly released. An auxiliary spring 102 mounted on the second contact plate 90 operates to forcefully retract plate 90 from its association with rod 41.

At this juncture, the plurality of springs 58 operate suddenly and rapidly to displace the rod 41 upwardly, resulting in the rod 41 impacting against the filter cloth 27 and bringing that cloth to a taut and tensioned orientation. The force of the rod 41 against the cloth 27 results in a whip-like motion within the fabric of the cloth 27 which serves to knock the cake deposits 42 from the surface of the cloth. Further, the force of gravity operates to cause the cake 42 to fall downwardly away from the surface of filter cloth 27.

It is to be understood that the embodiments herein described are merely illustrative of the principals of the invention. Reference herein to the details of the illustrated embodiments is not intended to limit the scope of the claims which themselves recite those features regarded as essential to the invention.

I claim:

1. An apparatus for removing filter cake in a filter press having a plurality of filter plates mounted within a frame; said filter plates being adapted for opening, including first and second adjacent filter plates, a pair of scissor-like suspension arms pivotedly mounted to each pair of adjacent filter plates an elongate horizontal first rod mounted above and between each pair of said adjacent filter plates, and a filter cloth, folded over the horizontal rod, and secured to the first and second filter plates, said apparatus comprising:

a second elongate rod mounted above said filter press and parallel said first rod, said second rod being connected to said first horizontal rod by means of a cable; said first rod being positioned to suspend said filter cloth in a tensioned, substantially inverted "V"-shaped configuratrion between any opened said first and second filter plates; and a return means mounted on each filter plate for rapidly returning said second rod to an equilibrium position subsequent to a displacement of said second rod; said return means comprising:

a first compression plate mounted on said suspension arms;

a first spring mounted on top of said first compression plate;

an elongate first shaft mounted on said second horizontal rod, having a first longitudinal axis; said first shaft extending through said first compression plate and through said first spring;

a second compression plate mounted on said elongate shaft wherein said first spring is positioned between said first and second compression plate; wherein a displacement of said second rod in a first direction effects a compression of said first spring along said first longitudinal axis;

a carriage mounted to slide along said frame;

an impact-loading means mounted on said frame said impact loading means comprising:

a first pneumatically operated cylinder having a second shaft, reciprocally slidable piston mounted therein; wherein said piston is driven in a first direction upon pressurized air being supplied to said cylinder;

a second spring mounted on said cylinder and over said second shaft wherein said second shaft extends through said second spring;

a third compression plate mounted on said second shaft wherein said second spring is mounted between said third compression plate and said cylinder wherein a displacement of said second shaft in said first direction effects a compression of said second spring; along said second longitudinal axis;

wherein a pneumatic pressure is applied to said piston inducing a displacement of said piston effecting a first direction displacement of said third compression plate with a corresponding displacement of said second rod; said second spring being compressed by said third compression plate's first direction displacement; said first rod being displaced in said first direction under the force of gravity as said second rod is displaced in said first direction; said first rod's first direction displacement operating to ease any tension applied to said filter cloth by said first horizontal rod;

wherein, thereafter; upon said pneumatic pressure on said piston being released, said second spring effects a rapid displacement of said third compression plate in said second direction thereby applying a sudden impact, tensioning load to said filter cloth through a displacement of said second horizontal rod in a second direction to effect a snapping motion in said filter cloth and thereby remove said filter cake from said filter cloth.

2. The apparatus of claim 1 wherein said cable is generally annular in shape thereby defining a central opening and wherein said first rod and said second rod pass through said central opening.

3. The apparatus of claim 2 wherein a shifting mechanism adapted to separate each said pair of adjacent filter plates is mounted on said carriage.

4. The apparatus of claim 3 wherein said third compression plate of said impact-loading means is dimensioned to extend along a plurality of opened, adjacent filter plates and contact each respective second rod of each pair of adjacent filter plates wherein a pneumatically induced first direction displacement of said second rods by said third compression plate facilitates a gravity induced displacement of each of said corresponding first rods of said plurality of filter plates and a subsequent release of pneumatic pressure on said third compression plate effects a rapid second direction displacement of each of said first rods thereby effcting a snapping motion in each respective filter cloth of each pair of said plurality of filter plates thereby removing said filter cloth from said filter cloths simultaneously.

5. In a filter press having a plurality of filter paltes defining opposite sides and opposite abutting faces, including a first and a second adjacent filter plates, having a filter medium disposed along the filtering surfaces of said first and second adjacent filter plates, a device for removing filter cake from said filter medium, said device comprising:
  a horizontal rod mounted above and between said pair of filter plates, said filter medium being folded over said rod whereby said filter medium is held in a substantially inverted "V"-shaped configuration;
  at least one pair of suspension arms, each arm having a first end pivotedly mounted on a side of said first filter plate and a second end pivotedly mounted on a corresponding side of said second filter plate;
  a plurality of springs, at least one spring being mounted on each suspension arm;
  a connection shaft mounted on each of said springs whereby a first displacement of said connection shaft results in a compression of said spring and a second displacement of said conenction shaft results in a release of said compressed spring, said connection shaft being connected to said horizontal rod whereby said first displacement operates to displace said hroizontal rod in a first direction, slackening said filter medium, thereby reducing any tension thereon, said second displacement in a opposite second direction operates to tension said filter medium by impact-loading said filter medium; and
  a third compression plate made mechanically cooperable with said connection shaft;
  an actuation means for displacing said third compression plate,
  said actuation means comprising:
    a pneumatic piston-fitted cylinder, having a drive shaft extending thereform adapted to be reciprocably displaced by said piston, said drive shaft being displaceable in a third direction by introduction of pressurized air into said cylinder, said drive shaft being mounted to said third compression plate;
    a return spring mounted on said drive shaft, between said cylinder and said third compression plate wherein a displacement of said drive shaft in said third direction effects a compression of said return spring and wherein a release of said pressurized air effects a rapid displacement of said third compression plate in a fourth direction, said fourth direction being opposite from said third direction;
  wherein a pneumatically induced displacement of said compression plate effects a first direction displacement of said rod and a slackening of said filter cloth and wherein a rapid fourth direction displacement of said third compression plate by said return spring effects a rapid second direction displacement of said rod, induced by said spring;
  wherein said actuation means facilitates a repeated first and second displacement of said rod for each opened pair of adjacent filter plates;
  wherein said compression plate adapted to contact and displace said connection means to effect a first displacement of said spring and thereafter to retract, permitting a second displacement of said spring, thereby effecting a snap-like motion of said filter medium by impact-loading.

6. The filter press of claim 5 wherein said actuation means is mounted on a carriage which is slidably mounted on said frame.

7. The filter press of claim 6 wherein a shifter means for separating each pair of adjacent filter plates is mounted on said carriage.

8. An apparatus for automatically removing cake from a filter cloth in a filter press having a plurality of parallel positioned filter plates mounted within a frame, said filter plates having oppositely positioned abutting faces and opposite sides, said apparatus comprising:
  a plurality of first and second adjacent filter plates,
  a first elongate horizontal rod positioned between each pair of filter plates;
  a second horizontal elongate rod positioned between each pair of filter plates, and a pair of filter cloths a first filter cloth having a first proximal end, fixedly mounted to a first filter plate, and a first distal end mounted on the first elongate, horizontally positioned rod, a second filter cloth having a second proximal end fixedly mounted to a second filter plate and a second distal end mounted on the second elongate, horizontally positioned rod, said first and second rods being positioned between said abutting first and second filter plate faces
  a pair of filter cloth suspension arms, each pair of suspension arms being pivotedly mounted to each adjacent pair of filter plates, each pair of suspension arms having a proximal end pivotedly mounted to said first filter plate and a distal end pivotedly mounted to said second filter plate;
  a first compression plate mounted on each said pair of suspension arms,
  at least one spring fixedly mounted on each said first compression plate,
  an elongate first shaft mounted slidably through each first compression plate, each said first shaft extending through said spring, said first shaft having a first longitudinal axis;
  a second compression plate fixedly mounted on each said first shaft wherein each said spring is positioned between a respective said first compression plate and a respective said second compression plate;
  a third elongate rod fixedly mounted on said first shafts, said third rod being positioned parallel to said first and second rods, wherein a first direction displacement of said third rod, parallel said first longitudinal axis, effects a compression of said spring and an oppositely directed, second directioned displacement of said third rod effects a release of said compression of said spring;

a cable having a first end and a second end, said first end being mounted on said first rod, said second end being mounted on said second rod, a center region of said cable being draped over said third rod, wherein a displacement of said third rod in said second direction effects a corresponding second direction displacement of said first and second rods and wherein a first direction displacement of said third rod facilitates a gravity induced first directioned displacement of said first and second rods, said third rod being movable between two conditions, a first condition wherein said spring is compressed and said filter cloths are made substantially untensioned and slack, and a second condition wherein said spring compression is suddenly released, and said spring effects a snap-like, impact-loading tensioning of said filter cloths; and an actuation means made mechanically cooperate with said spring and adapted to control the motion of said spring between said first condition and said second condition.

* * * * *